US 6,632,016 B2

(12) United States Patent
Chen et al.

(10) Patent No.: US 6,632,016 B2
(45) Date of Patent: Oct. 14, 2003

(54) METHOD OF STABILIZING AN INFRARED CLINICAL THERMOMETER AND THE APPARATUS THEREOF

(76) Inventors: Min-Ying Chen, PO BOX 82-144, Taipei (TW); Sanlian Chen, PO BOX 82-144, Taipei (TW)

( * ) Notice: Subject to any disclaimer, the term of this patent is extended or adjusted under 35 U.S.C. 154(b) by 10 days.

(21) Appl. No.: 09/899,200

(22) Filed: Jul. 6, 2001

(65) Prior Publication Data

US 2003/0007546 A1 Jan. 9, 2003

(51) Int. Cl.[7] .................................................. G01J 5/04
(52) U.S. Cl. ...................... 374/164; 374/131; 374/132
(58) Field of Search .............................. 374/131, 132, 374/133, 164

(56) References Cited

U.S. PATENT DOCUMENTS

| | | | | |
|---|---|---|---|---|
| 4,183,248 A | * | 1/1980 | West ............................ | 374/164 |
| 4,673,300 A | * | 6/1987 | Wilhelmson et al. ........ | 374/182 |
| 4,790,324 A | * | 12/1988 | O'Hara et al. ............... | 600/474 |
| 6,036,361 A | * | 3/2000 | Gregory et al. .............. | 374/185 |
| 6,250,802 B1 | * | 6/2001 | Dotan ........................... | 374/164 |
| 6,495,806 B2 | * | 12/2002 | Siefert ......................... | 219/494 |

FOREIGN PATENT DOCUMENTS

| | | | | |
|---|---|---|---|---|
| JP | 2000225096 A | * | 8/2000 | ............ A61B/5/00 |

* cited by examiner

Primary Examiner—Diego Guiterrez
Assistant Examiner—Lydia M. De Jesús
(74) Attorney, Agent, or Firm—Leong C. Lei

(57) ABSTRACT

A method of stabilizing a clinical thermometer and the apparatus thereof are disclosed. The method comprises the steps of pre-heating the surrounding temperature to a pre-set temperature prior to using the clinical thermometer for measuring temperature; and providing compensational temperature by way of heat energy by a control circuit such that the surrounding temperature is maintained and stabilized at the pre-set temperature so as to avoid the change of the surrounding temperature from affecting the measured temperature. The stabilizing devices for a clinical thermometer comprises a clinical thermometer probe head which is a material capable of producing heat energy; and a heating controller connected to the probe head which provides cavity heating for the probe head prior to temperature measuring to the pre-set surrounding temperature, thereby the heating controller causes the surrounding temperature to maintain at a constant and stable temperature such that the precision of measuring is accurate.

1 Claim, 6 Drawing Sheets

METHOD OF STABILIZING AN INFRARED CLINICAL THERMOMETER AND THE APPARATUS THEREOF

BACKGROUND OF THE INVENTION (a) Field of the Invention

The present invention relates to a method of stabilizing a clinical thermometer and the apparatus thereof, and in particular, a method to stabilize the surrounding temperature of the cavity of the clinical thermometer probe head so as to avoid precision of measurement by the clinical thermometer as a result of unstable surrounding temperature.

(b) Description of the Prior Art

The cavity of the probe head of a common infrared clinical thermometer contains a guided wave tube, an infrared temperature sensing element and other related components so as to provide function of temperature measurement. However, the guided wave tube or other associated components are made from metal as the heating rate of metal is faster and the heat dissipation is also fast, and this provides a balance to the surrounding temperature, i.e., the surrounding temperature is evenly distributed along the tube body of the guided wave tube, however, this is not a stable temperature (some time at a higher temperature, and some time at a lower temperature). This temperature will affect the accuracy of the detected temperature data, and the infrared temperature-sensing element of the conventional infrared clinical thermometer will sense the temperature of the surrounding, and the measured temperature is thus not accurate. Although there is guided wave tube made from plastic material, the surrounding temperature cannot be stabilized to provide a specific surrounding temperature. Therefore, after the infrared temperature sensing element is used to measure the temperature of the human body, the infrared temperature sensing element and the associated component in the course of temperature measuring are always affected by the change of the surrounding temperature, and in actual, the measured temperature is always not stable and the measured temperature may not be accepted by the user. Accordingly, it is an object of the present invention to provide a method of stabilizing a clinical thermometer and the apparatus thereof which mitigates the above drawbacks.

SUMMARY OF THE INVENTION

Accordingly, it is an object of the present invention to provide a method of stabilizing a clinical thermometer, comprising the steps of pre-heating the surrounding temperature to a pre-set temperature prior to using the clinical thermometer for measuring temperature; and providing compensational temperature by way of heat energy by a control circuit such that the surrounding temperature is maintained and stabilized at the pre-set temperature so as to avoid the change of the surrounding temperature from affecting the measured temperature.

Yet another object of the present invention is to provide a stabilizing device for a clinical thermometer comprising a clinical thermometer probe head which is made from a material capable of producing heat energy; and a heating controller connected to the probe head which provides heating for the probe head prior to temperature measuring to the pre-set surrounding temperature, thereby the heating controller causes the surrounding temperature to maintain at a constant and stable temperature such that the precision of measuring is accurate.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 1:
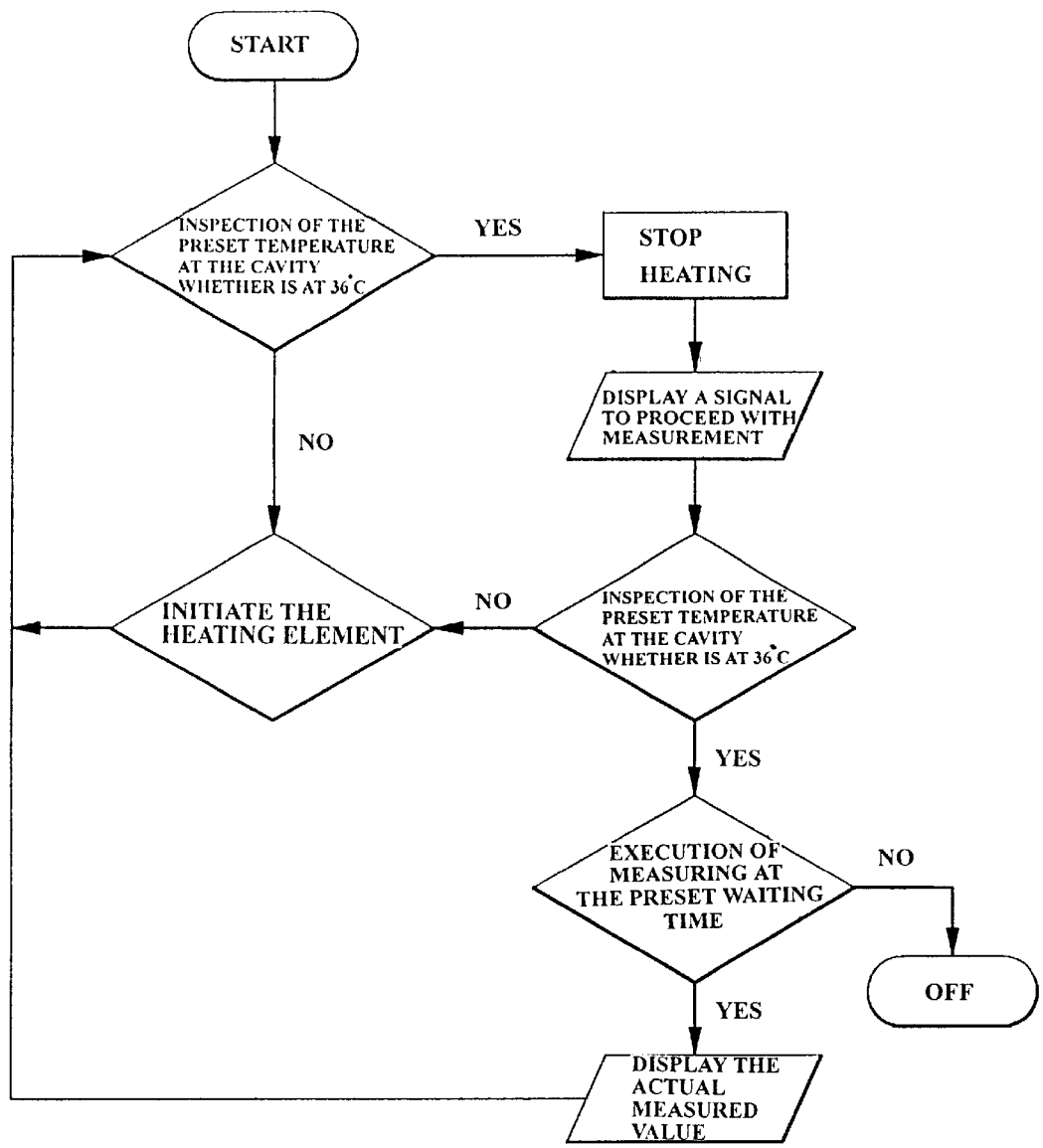
FIG. 1 is a control flowchart of the heating of the clinical thermometer probe head of the present invention.
Figure 2:
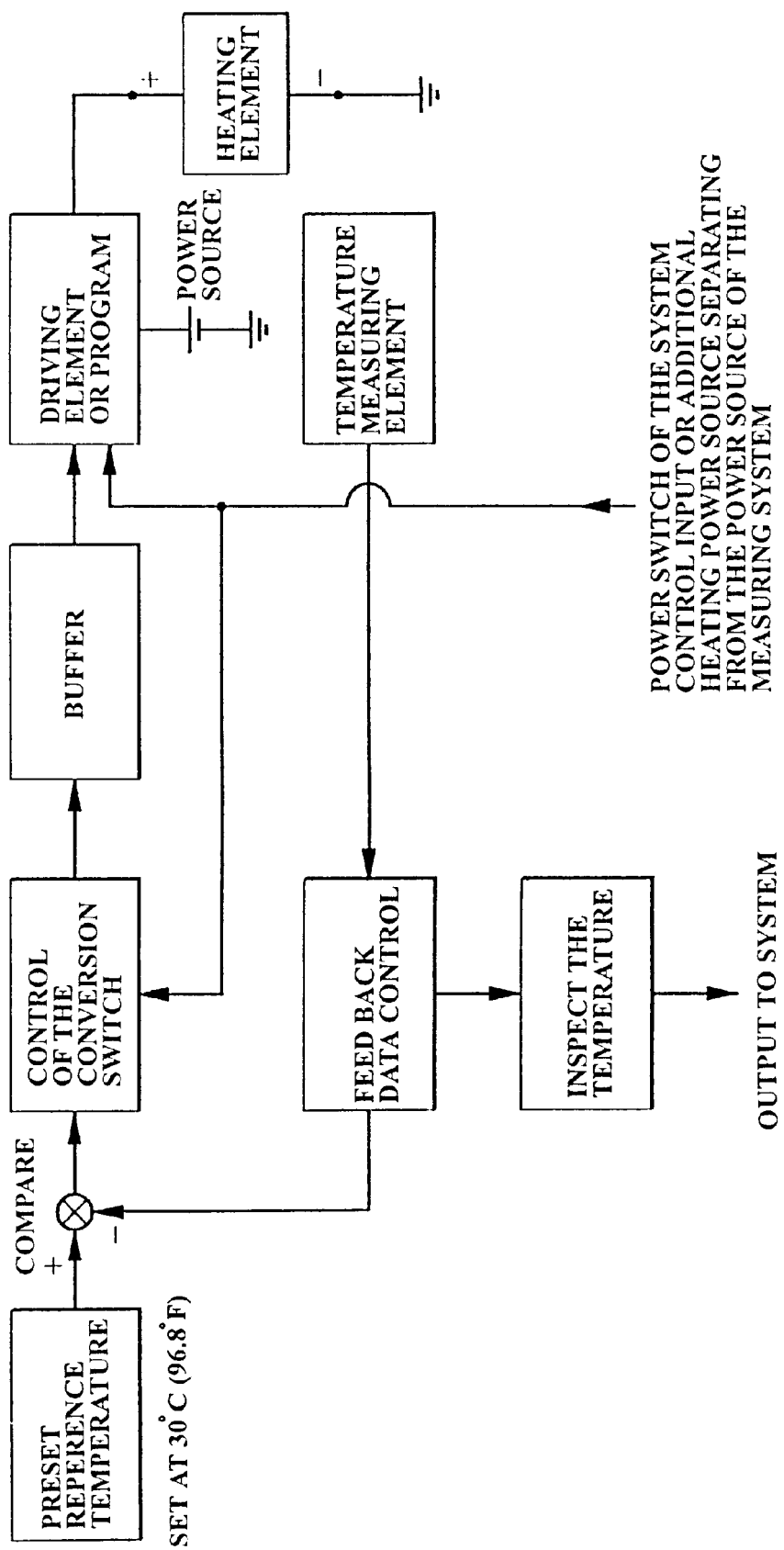
FIG. 2 is a block diagram showing the temperature control system of the present invention.
Figure 3:
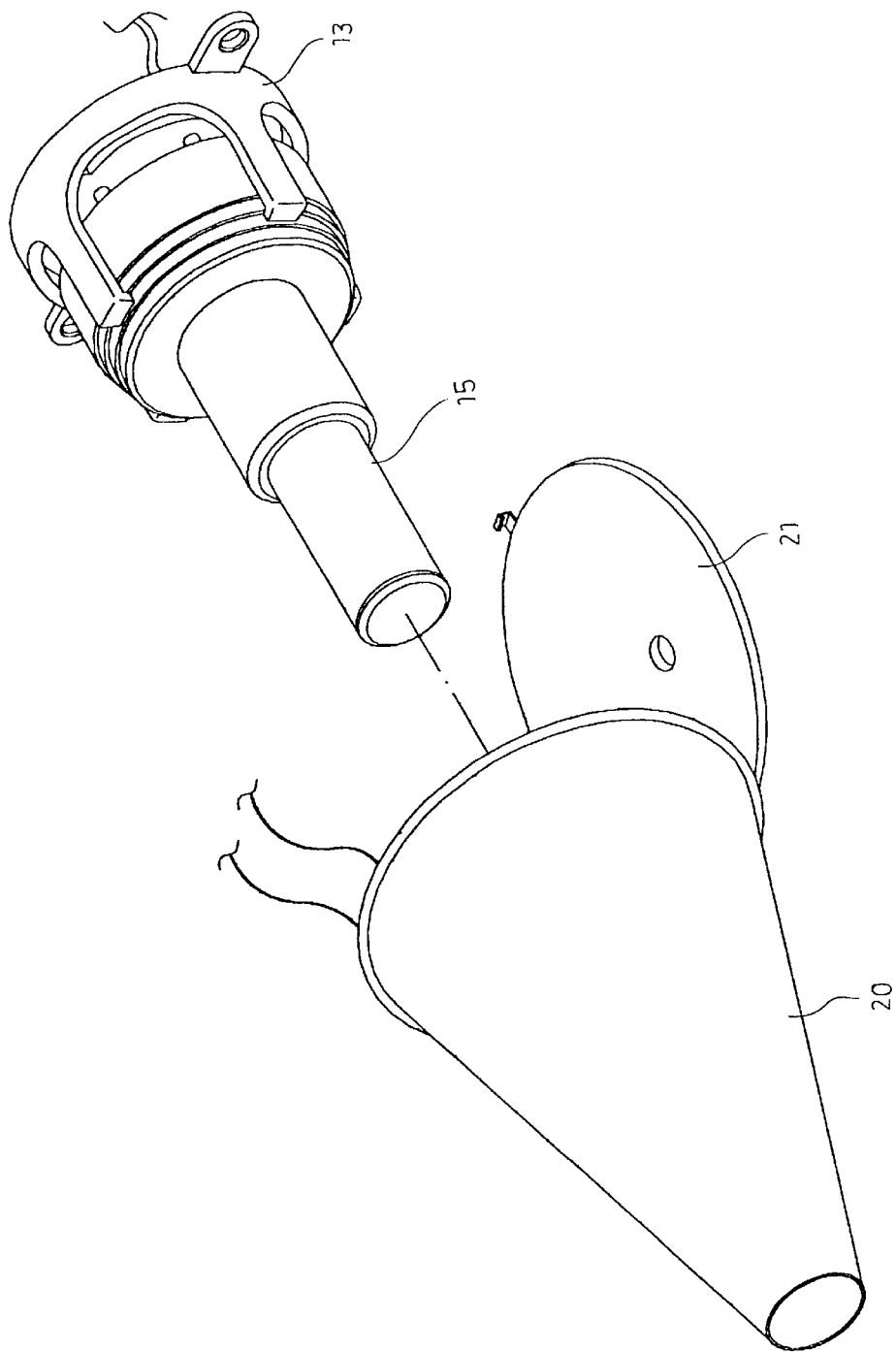
FIG. 3 is a perspective view of the heating element of the present invention.
Figure 4:
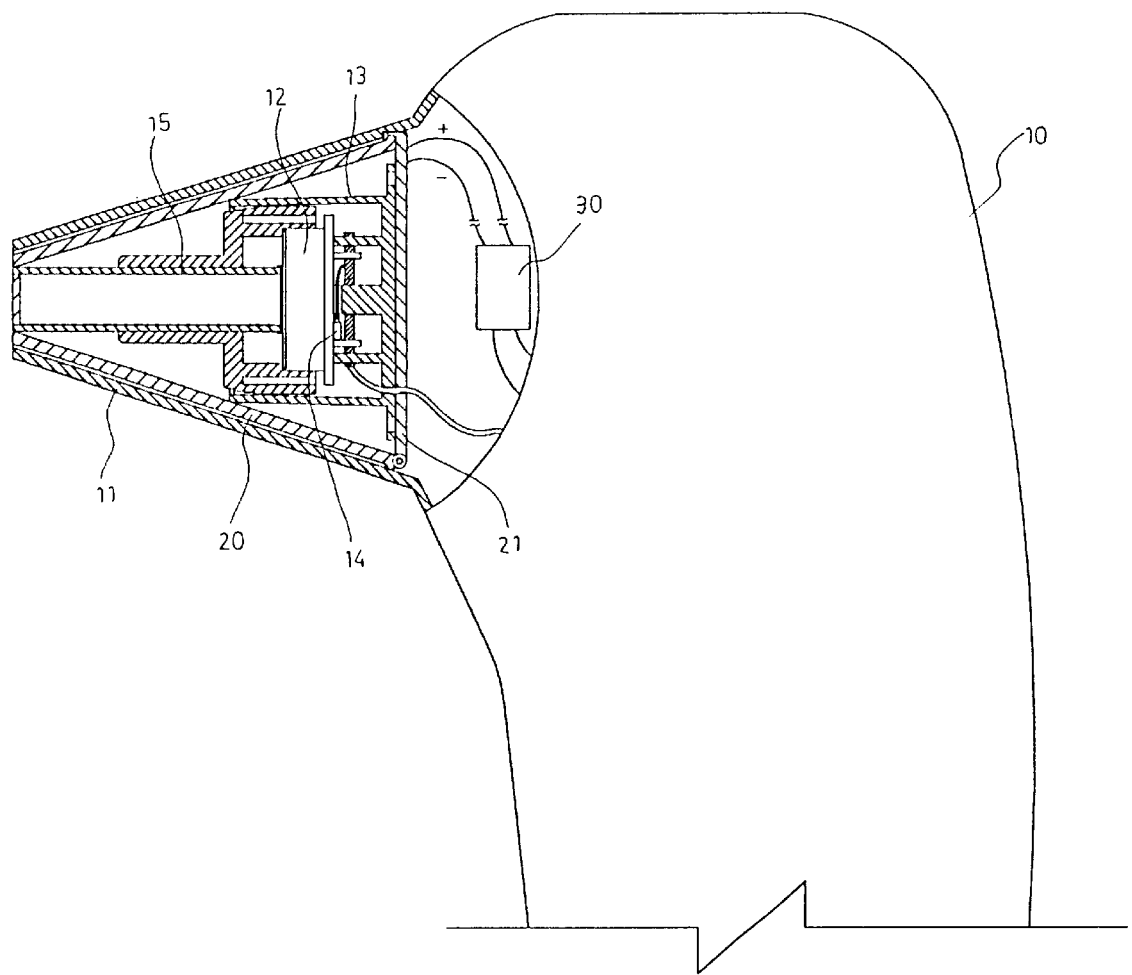
FIG. 4 is a schematic view showing the heating elements mounted within the interior of the probe head of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Referring to FIGS. 1, 2, 3, and 4 there is shown the device of stabilizing temperature of a clinical thermometer being mounted onto a probe head 11 of a clinical thermometer 10.

The probe head 11 contains a heating element 20 and the probe head 11 is a conventional element and further description thereto is not required. The probe head 11 is positioned at the front end of the clinical thermometer 10 and has a funnel shaped body which will contact with the ear and mouth of the human body in the course of temperature-measuring. The cavity of the probe head 11 is provided with an infrared temperature sensor 12, a seat body 12, a temperature-sensitive resistance 14, a guided wave tube 15. The material for the heating element 20 is a conductive material and will produce heat energy if a current passes through the heating element 20. The shape of the heating element 20 is a conic shape and is either or indirectly contact with the enclosed associated components within the interior of the probe head 11, or the partial enclosed components. One end of the heating element 20 is an opening, allowing the infrared ray to enter. The other end of the heating element 20 is pivotally mounted with a cap body 21, allowing the opening up of the cap body 21 for replaceable of components, if there is a need. The heating element 20 is connected to a heating controller 30 which possesses temperature controlling function and by means of a circuit to control the heating element 20 by heating to an appropriate surrounding temperature so as to avoid the rapid exhaustion of the power supply due to the heating of the heating element 20. The heating power source of the heating element 20 is designed in such a way that a separate power source is used and it is different from that used in the measuring system.

In accordance with the present invention, the method of stabilizing the clinical thermometer comprises the steps of (a) pre-heating the surrounding temperature to a pre-set temperature prior to using the clinical thermometer for measuring temperature; and (b) providing compensational temperature by way of heat energy by a control circuit such that the surrounding temperature is maintained and stabilized at the pre-set temperature so as to avoid the change of the surrounding temperature from affecting the measured temperature.

The details of the controlling flow chart are as follows: When the clinical thermometer 10 is switched to the ON position, the temperature measuring element (for instance, temperature sensitive resistance 14, or the controller 30) will first inspect the cavity of the clinical thermometer 10 whether it is at the pre-set surrounding temperature (for instance 36° C. or 96.8° C.). If this temperature has not been reached, the heating element 20 is initiated to proceed with the heating until it reaches the surrounding temperature. If the pre-set temperature is attained, the heating element 20 stops to produce heat and a signal is sent out from the control circuit to the thermometer which indicates a signal to proceed to temperature measurement. After that the temperature stabilizing system makes use of the heating controller 30 to check the cavity of the probe head whether the pre-set surrounding temperature is reached so as to compensate a temperature thereto.

Thus, during the waiting time, the clinical thermometer can proceed with temperature measuring so as to obtain a precise measurement. If a measuring of the clinical temperature is not made during the waiting time, the clinical thermometer will be switch to OFF position.

In accordance with the present invention, other than pre-heating the probe head 11 of the clinical thermometer 10 by the heating element 20, the probe head 11 can be used as an element used to proceed with the heating so as to reduce the cost of production.

Figure 5:
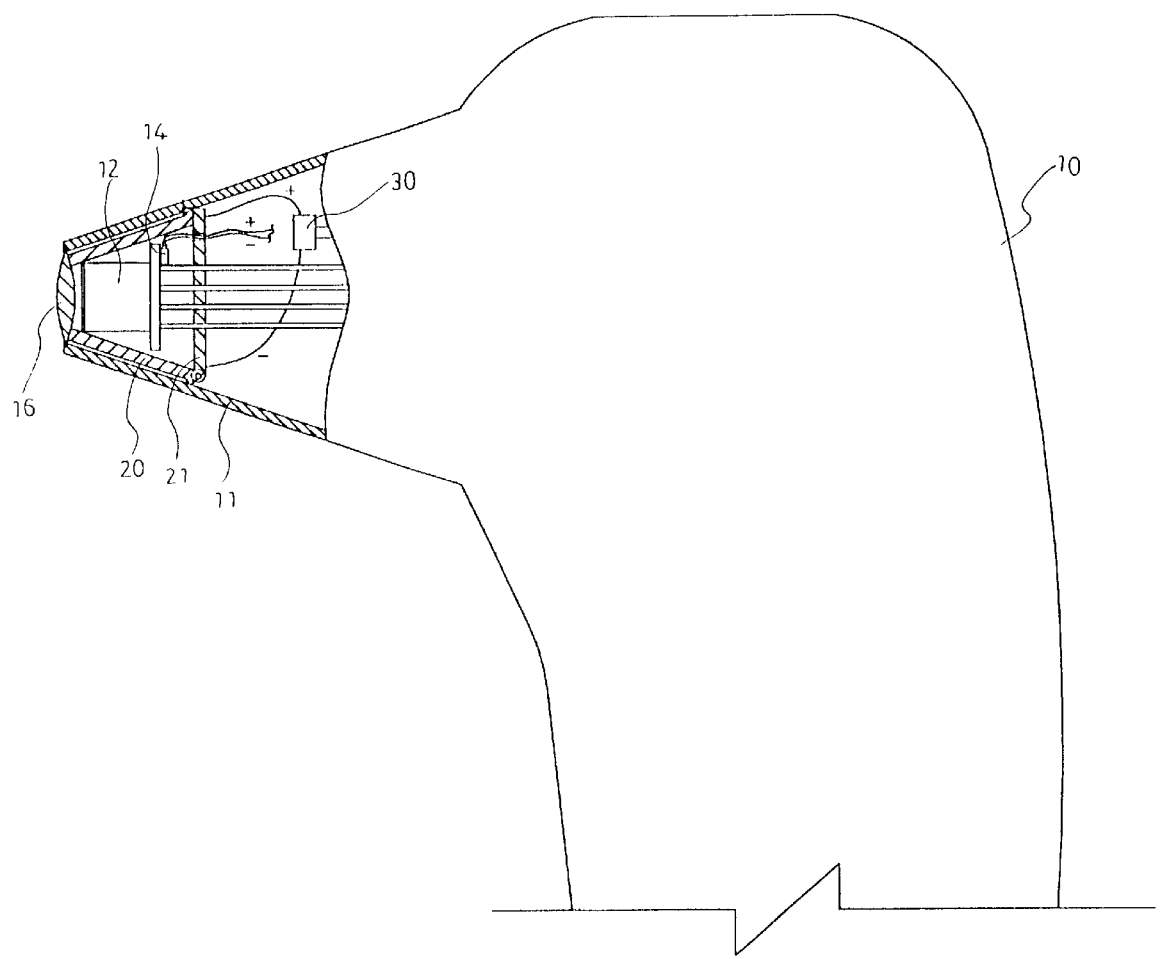
FIG. 5 schematically shows the heating element together with a non-conductive wave tube Infrared temperature sensor in accordance with the present invention.

Referring to FIG. 5, the heating element 20 of the present invention can be a clinical thermometer probe head 11 enclosed an infrared temperature-sensing element (thermometer) 12 with Infrared guided wave tube. The front end of the probe head 11 is provided with a convex lens 16 to effectively focus the Infrared ray emitted from the human body for the sensing of the Infrared temperature sensing element 12.

Figure 6:
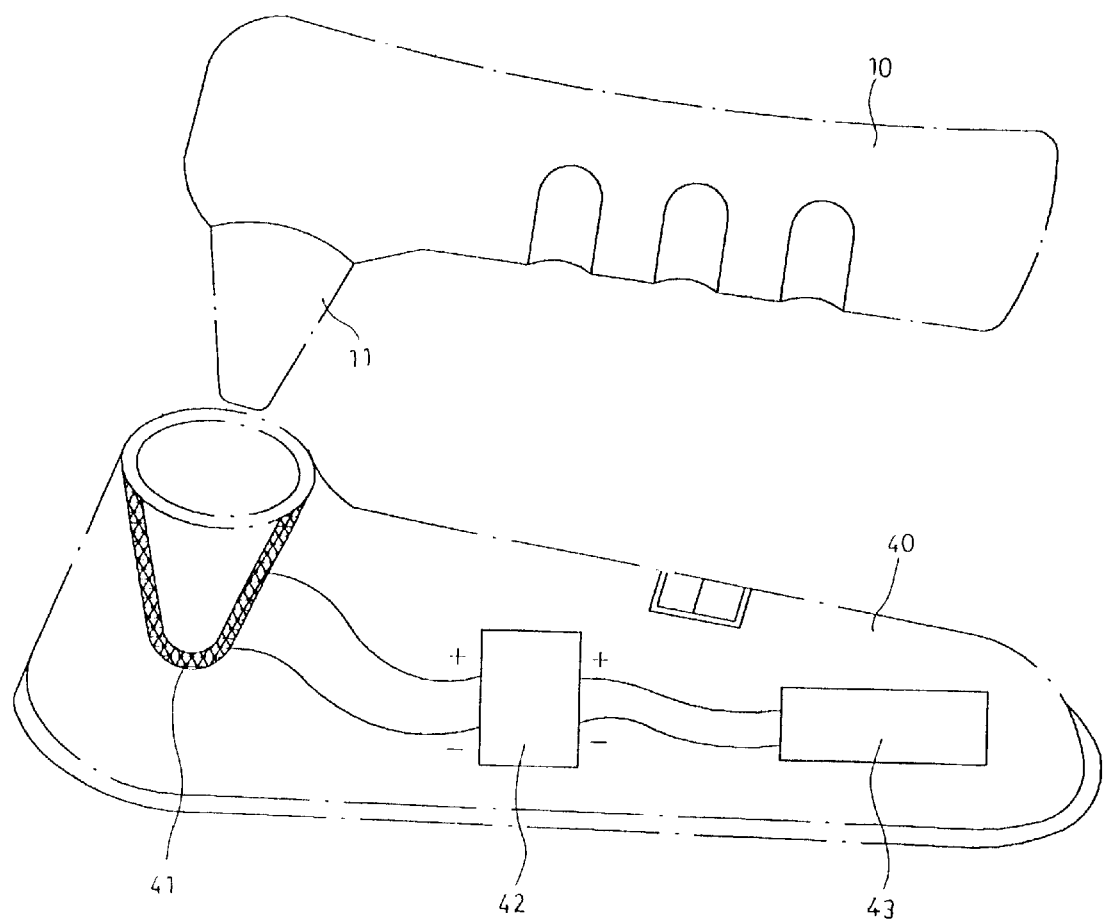
FIG. 6 is a schematic view showing the structure of a separate heating device of the present invention.

Referring to FIG. 6, the pre-heating temperature-stabilizing device at the probe head 11 can be the heating element 20 or the probe head 11, in order to reduce the battery exhaustion of the probe head 11 in the pre-heating process, a separate pre-heating device 40, separated from the clinical thermometer, is provided. The pre-heating device 40 has a seat body shape, and the interior thereof is provided with a heating element 41, a heating controller 42, a power source device 43, wherein the heating element 41 is designed into a shape corresponding to the external of the probe head 11 so that the probe head 11 is covered.

Thus, before the clinical thermometer 40 proceeds to measuring temperature of a human body, the probe head 11 is placed at the heating element 41, and heating is proceeded from the surrounding of the probe head 11. After the heat reaches the pre-set temperature, the temperature is kept constant. The maximum heating temperature is similar to the pre-set temperature of the probe head 11.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We: claim:

1. A stabilizing device for an infrared clinical thermometer comprising:

a clinical thermometer probe head which is a material capable of producing heat energy; and a heating controller connected to the probe head which provides cavity heating for the probe head prior to temperature measuring to the pre-set surrounding temperature;

wherein the clinical thermometer probe head is provided with a heating element, and the heating element is connected to the heating controller, the heating element is of a circular conical shape having one open end and the other end is pivotally connected to a cap body;

whereby the heating controller causes the surrounding temperature to maintain at a constant and stable temperature such that the precision of measuring is accurate.

* * * * *